(12) United States Patent
Gibson et al.

(10) Patent No.: US 10,758,035 B2
(45) Date of Patent: *Sep. 1, 2020

(54) INTELLIGENT OFFICE FURNISHINGS

(71) Applicant: HERMAN MILLER, INC., Zeeland, MI (US)

(72) Inventors: Jeff Gibson, Zeeland, MI (US); Christopher Hoyt, Grand Rapids, MI (US); Nicolas Milani, Zeeland, MI (US); Kurt Dykema, Holland, MI (US); Dave Moelker, Holland, MI (US); Jared Thomas, Zeeland, MI (US)

(73) Assignee: HERMAN MILLER, INC., Zeeland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 16/692,314

(22) Filed: Nov. 22, 2019

(65) Prior Publication Data
US 2020/0085183 A1 Mar. 19, 2020

Related U.S. Application Data

(63) Continuation of application No. 16/071,705, filed as application No. PCT/US2017/014904 on Jan. 25, 2017, now Pat. No. 10,531,731.
(Continued)

(51) Int. Cl.
*A47B 85/00* (2006.01)
*A47B 9/00* (2006.01)
(Continued)

(52) U.S. Cl.
CPC ............... *A47B 9/00* (2013.01); *A47B 21/02* (2013.01); *A47B 83/02* (2013.01); *G08B 21/22* (2013.01);
(Continued)

(58) Field of Classification Search
CPC .......... A47B 9/00; A47B 21/02; A47B 83/02; A47B 2009/006; A47B 2200/0039;
(Continued)

(56) References Cited

U.S. PATENT DOCUMENTS 9,380,682 B2 6/2016 Mead et al.
9,642,219 B2 5/2017 Mead et al.
(Continued)

FOREIGN PATENT DOCUMENTS

CN 10482497 A 8/2015
CN 104824971 A 8/2015
(Continued)

OTHER PUBLICATIONS

International Search Report with Written Opinion for related Application No. PCT/US2017/014904 dated May 8, 2017 (10 Pages).

*Primary Examiner* — Matthew W Ing
(74) *Attorney, Agent, or Firm* — Michael Best & Friedrich LLP

(57) ABSTRACT

A method of communicatively pairing a first furnishing item with a second furnishing item, the method including impacting the first furnishing item against the second furnishing item. The method also includes generating a first output with a first sensor of the first furnishing item in response to an impact between the first furnishing item and the second furnishing item and generating a second output with a second sensor of the second furnishing item in response to the impact between the first furnishing item and the second furnishing item. The method further includes receiving, by a controller, the first output, receiving, by the controller, the second output, and pairing a first communication circuit of the first furnishing item with a second communication
(Continued)

circuit of the second furnishing item in response to receiving the second output within a predetermined time of receiving the first output.

19 Claims, 13 Drawing Sheets

Related U.S. Application Data

(60) Provisional application No. 62/286,731, filed on Jan. 25, 2016.

(51) Int. Cl.
    *H04Q 9/04*     (2006.01)
    *A47B 21/02*     (2006.01)
    *A47B 83/02*     (2006.01)
    *G08B 21/22*     (2006.01)

(52) U.S. Cl.
    CPC .......... *H04Q 9/04* (2013.01); *A47B 2009/006* (2013.01); *A47B 2200/0039* (2013.01); *A47B 2200/0056* (2013.01); *A47B 2200/0061* (2013.01); *A47B 2200/0062* (2013.01); *H04Q 2209/823* (2013.01)

(58) Field of Classification Search
    CPC .... A47B 2200/0056; A47B 2200/0061; A47B 2200/0062
    See application file for complete search history.

(56) References Cited

U.S. PATENT DOCUMENTS

| | | |
|---|---|---|
| 9,766,079 B1 | 9/2017 | Poel et al. |
| 9,852,388 B1 | 12/2017 | Swieter et al. |
| 9,921,726 B1 | 3/2018 | Sculley et al. |
| 9,955,318 B1 | 4/2018 | Scheper et al. |
| 10,021,530 B2 | 7/2018 | Sigal et al. |
| 10,531,731 B2 | 1/2020 | Gibson et al. |
| 2011/0295392 A1 | 12/2011 | Cunnington et al. |
| 2014/0096706 A1 | 4/2014 | Labrosse et al. |
| 2015/0059096 A1 | 3/2015 | Rawls-Meehan |
| 2017/0208664 A1 | 7/2017 | Mead et al. |
| 2019/0029412 A1 | 1/2019 | Gibson et al. |

FOREIGN PATENT DOCUMENTS

| | | |
|---|---|---|
| EP | 2355563 A1 | 8/2011 |
| WO | 2015032545 A1 | 3/2015 |

INTELLIGENT OFFICE FURNISHINGS

CROSS-REFERENCE TO RELATED APPLICATIONS

This application is a continuation of U.S. patent application Ser. No. 16/071,705, filed Jul. 20, 2018, also entitled "INTELLIGENT OFFICE FURNISHINGS," which is a U.S. National Phase application of PCT/US17/14904 filed Jan. 25, 2017, which claims priority to U.S. Provisional Application No. 62/286,731 filed Jan. 25, 2016, the entire disclosure of which are hereby incorporated by reference.

BACKGROUND

The present invention relates to office furnishings. In particular, the present invention relates to intelligent office furnishings.

SUMMARY

In one embodiment, the invention provides a method of communicatively pairing a first furnishing item with a second furnishing item. The method includes impacting the first furnishing item against the second furnishing item, generating a first output with a first sensor of the first furnishing item in response to the impact between the first furnishing item and the second furnishing item, and generating a second output with a second sensor of the second furnishing item in response to the impact between the first furnishing item and the second furnishing item. The method also includes receiving, by a controller, the first output, receiving, by the controller, the second output within a predetermined time of receiving the first output, and pairing a first communication circuit of the first furnishing item with a second communication circuit of the second furnishing item in response to receiving the second output within the predetermined time of receiving the first output.

In another embodiment, the invention provides a desk including a work surface, a support framework for supporting the work surface, and a motor coupled to the support framework. The motor is operable to move the support framework to change a height of the support framework. The desk also includes a wireless communication circuit coupled to the work surface, a sensor coupled to the work surface, and a controller coupled to the work surface. The wireless communication circuit is operable to receive a message from a chair within a communication range of the wireless communication circuit. The message includes information regarding a sensed rotation of the chair. The sensor is operable to generate an output indicative of a presence of a user near the desk. The controller is electrically coupled to the motor. The controller is operable to receive the output from the sensor, receive the message from the chair indicative of the sensed rotation of the chair, determine a position of the user based on the received message and the received output from the sensor, and generate a control signal to the motor based on the determined position of the user.

Other aspects of the invention will become apparent by consideration of the detailed description and accompanying drawings.

DETAILED DESCRIPTION

Figure 1:
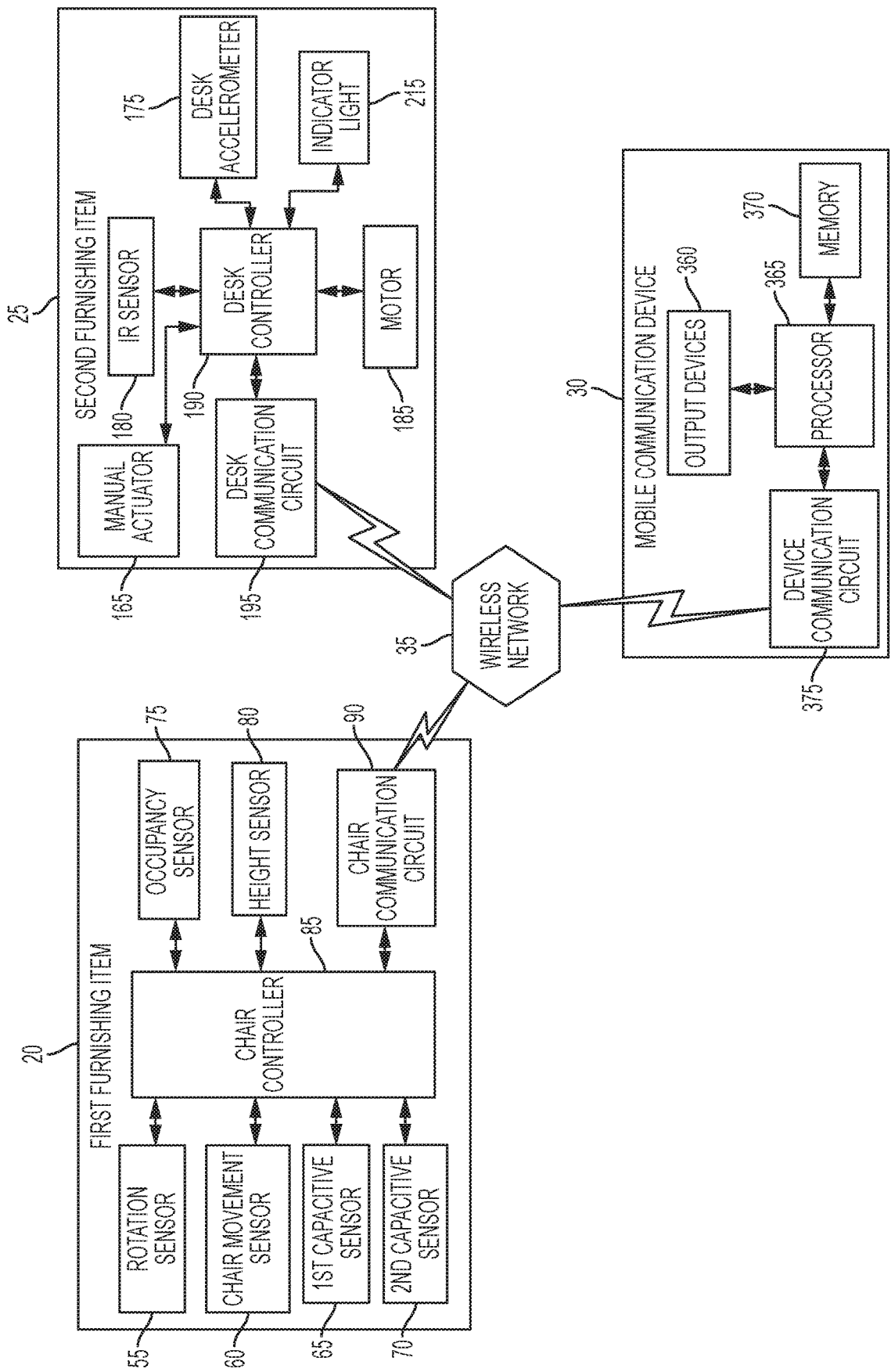
FIG. 1 is a block diagram of an intelligent furnishing system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates an intelligent furnishing system 10 including a first furnishing item 20, a second furnishing item 25, and a mobile communication device 30 (e.g., an external device). In the illustrated embodiment, the first furnishing item 20 corresponds to a chair, and the second furnishing item 25 corresponds to a desk. More particularly, the second furnishing item 25 is a height adjustable desk (commonly referred to as a sit-stand desk) that changes heights so a user can either sit at the desk or stand at the desk. The chair 20, desk 25, and mobile communication device 30 communicate with each other via a short range wireless network 35, such as a Bluetooth® network. As further explained below, these communications are used to control automatic movement of the desk 25 between a sitting height, or position, and a standing height, or position. In the illustrated embodiment, the mobile communication device 30 is associated with a particular user.

Figure 2:
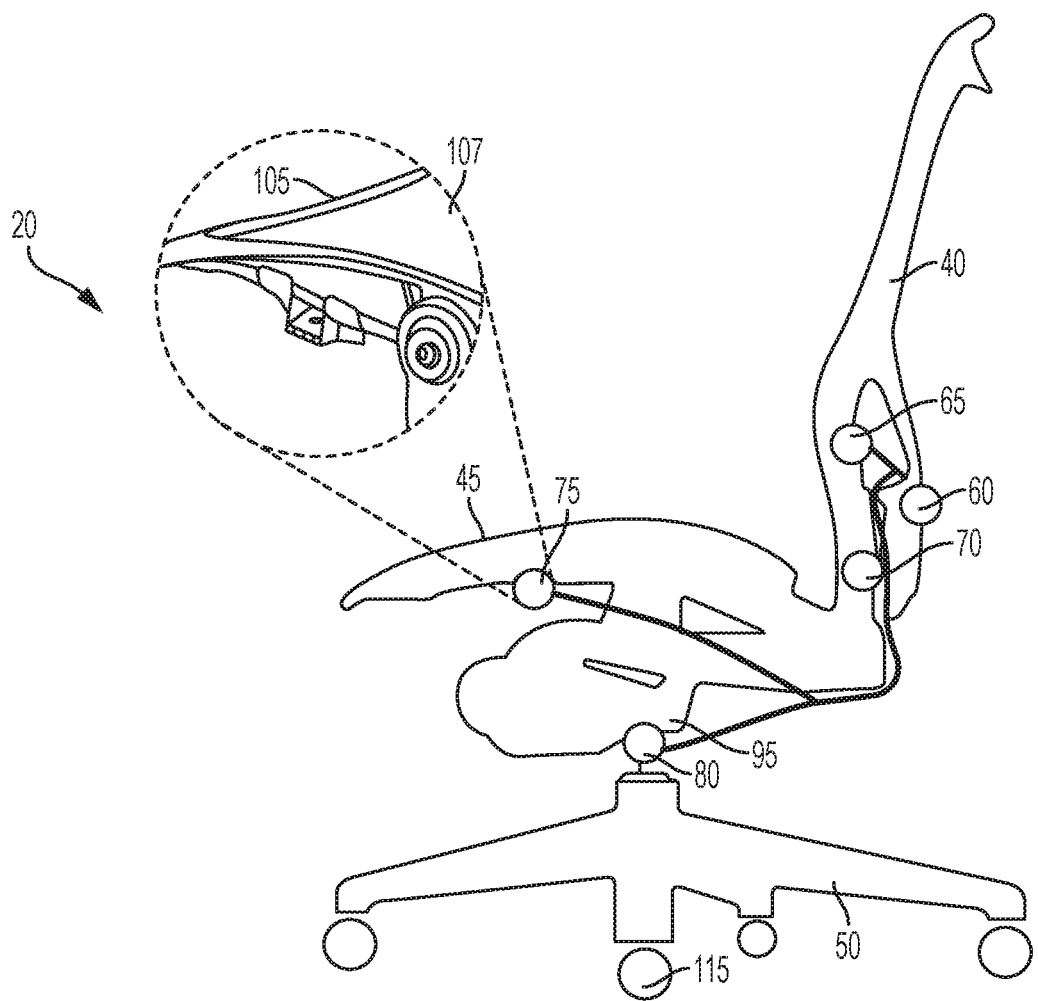
FIG. 2 is a schematic diagram of a chair of the intelligent furnishing system of FIG. 1.

As shown in FIG. 2, the chair 20 includes a back 40, a seat 45, and a support structure 50. The chair 20 may be, for example, an Aeron chair sold by Herman Miller of Zeeland, Mich. The illustrated chair 20 also includes a plurality of sensors and electronics coupled to different structures of the chair 20. For example, in the embodiment illustrated in FIGS. 1 and 2, the chair 20 includes a rotation sensor 55, a chair impact sensor 60, a first capacitive sensor 65, a second capacitive sensor 70, an occupancy sensor 75, a height sensor 80, a chair controller 85, and a chair communication circuit 90. The term "chair sensors" is used to refer to sensors 55, 60, 65, 70, 75, 80 individually, collectively, and in various combinations with each other or in combination with other sensors not explicitly noted here. The chair sensors gather data about the chair 20, such as the position of the chair 20 relative to the desk 25, whether a user is occupying the chair 20, and the position of the user within the chair 20. The chair controller 85 receives and processes data from sensors, and the chair communication circuit 90 transmits this data to the desk 25.

In the illustrated embodiment, the chair controller 85 is implemented by a processor or microcontroller. In some embodiments, the chair controller 85 may be physically supported by the chair 20. In other embodiments, the chair controller 85 may be located remotely from the chair 20. For example, the chair controller 85 may be part of the mobile communication device 30 such that data processing is performed by the mobile communication device 30. Alternatively, the chair controller 85 may be physically supported by the desk 25. Further, the chair controller 85 may be part of a remote server with which the chair 20 communicates via the communication circuit 90. In such embodiments, the chair communication circuit 90 sends unprocessed data from the chair sensors to the chair controller 85.

In the illustrated embodiment, the rotation sensor 55 includes a magnetometer supported by the chair 20 and electrically coupled to (e.g., electronically communicates with via a wired or wireless configuration) the chair controller 85. The magnetometer measures the direction of the earth's magnetic field and generates an angular output indicative of an angle from a reference position (e.g., when the magnetometer faces to the "front") to earth's magnetic north. In one embodiment, the magnetometer is positioned within the chair 20 at a top 95 of the support structure 50. The angular output of the magnetometer changes according to the rotation of the chair 20. For example, as the chair 20 rotates to the right, the angular output from the magnetometer increases, and as the chair 20 rotates to the left, the angular output from the magnetometer decreases. In other examples, however, the change of the angular output from the magnetometer may change differently according to the rotation of the chair 20.

In some embodiments, the rotation sensor 55 includes other types of sensors, such as a gyroscope, an encoder, or a camera. The chair 20 may include one or more rotation sensors 55 to determine the rotation of the chair 20. The rotation sensor 55 determines a reference value for a reference position. In other words, the rotation sensor 55 measures its output when the chair 20 is in a reference position (e.g., facing the desk 25). Subsequent measurements from the rotation sensor 55 are then compared to the reference value to determine the amount of rotation (e.g., the angular output) with respect to the reference position. The rotation sensor 55 outputs an angular output indicative of a rotation of the chair 20 with respect to a reference position.

The rotation sensor 55 sends the angular output to the chair controller 85. The chair controller 85 may compare a plurality of angular outputs from the rotation sensor 55 to determine whether the chair 20 rotates (or has rotated), and the direction of rotation (e.g., whether the chair 20 rotates to the clockwise or counterclockwise relative to the desk 25). In some embodiments, the chair controller 85 may determine the rotation of the chair 20 based on one or more angular outputs from the rotation sensor 55. For example, the chair controller 85 may determine that the chair 20 rotates (to the right or to the left) when the angular output (or the absolute value of the angular output) from the rotation sensor 55 exceeds a predetermined threshold. In such an example, the predetermined threshold is indicative of a rotation of the chair 20. In some embodiments, the chair controller 85 may determine that the chair 20 rotates when a difference between two angular outputs from the rotation sensor 55 exceeds a predetermined threshold. In other embodiments, the chair controller 85 may analyze the rate of change of the angular outputs from the rotation sensor 55 to determine a speed of rotation of the chair 20. In some embodiments, a combination of analyses of the angular outputs from the rotation sensor 55 is performed to determine the rotation of the chair 20.

In the illustrated embodiment, the chair movement sensor 60 includes an accelerometer supported by the chair 20 and is also electrically coupled to (e.g., communicates with) the chair controller 85. The chair accelerometer measures an acceleration of the chair 20 and generates a movement output indicative of change in movement of the chair 20. In the illustrated embodiment, the accelerometer is a three-axis accelerometer. The change in movement of the chair 20 may be indicative of a change of location of the chair 20 (e.g., displacement about a room), an impact received by the chair 20, or a change in position of the chair (e.g., changing a reclining angle of the chair 20). As shown in FIG. 2, the chair accelerometer is positioned on the back 40 of the chair 20. In some embodiments, the chair accelerometer is positioned elsewhere on the chair 20. In one example, as the back 40 of the chair 20 is moved into a reclined position (i.e., the reclining angle changes), the movement output from the chair accelerometer changes rapidly. Similarly, when the back 40 of the chair 20 moves from a reclined position to an upright position, in which the back 40 of the chair 20 is approximately perpendicular to a horizontal reference level (e.g., the floor or ground), the movement output from the chair accelerometer changes rapidly again.

In some embodiments, the chair movement sensor 60 may include a chair vibration sensor (e.g., a jiggle sensor). The chair vibration sensor may be used to replace the chair accelerometer and generate the movement output. In some embodiments, the chair 20 may include both an accelerometer and a vibration sensor to generate a first and a second movement outputs. The chair vibration sensor may be electrically coupled to the chair controller 85. The vibration sensor may also be configured to generate the movement output when a vibration is detected on the chair 20 (e.g., a bump to the chair 20). The movement output from the vibration sensor, like the movement output from the accelerometer may be sent to the chair controller 85. In some embodiments, the chair 20 may include both a chair accelerometer to detect changes in position of the user (e.g., reclined vs. upright) and a vibration sensor to detect impacts (e.g., bumps or taps to the chair 20).

The chair movement sensor 60 sends the movement output (e.g., from the chair accelerometer, the chair vibration sensor, or both) to the chair controller 85. The chair controller 85 analyzes one or more movement outputs to determine whether the chair 20 has been moved (e.g., to a different location within a room), the position of the chair 20 has changed (e.g., the chair 20 moved from an upright position to a reclined position or from a reclined position to an upright position), or an impact was received by the chair 20. For example, the chair controller 85 may determine that the chair 20 moves or shifts position when the movement output (e.g., the absolute value of the angular output) from the chair movement sensor 60 exceeds a predetermined threshold. In such an example, the predetermined threshold is indicative of a movement or shift in position of the chair 20. In some embodiments, the chair controller 85 uses different predetermined thresholds to determine what type of movement change was experienced by the chair 20. For example, the chair controller 85 may determine that the reclining angle of the chair 20 changed if the movement output exceeds a first predetermined threshold, an impact was received by the chair 20 when the movement output exceeds a second predetermined threshold, and/or the chair 20 moved positions (e.g., to a different location within or outside a room) when the movement output exceeds a third predetermined threshold. In some embodiments, the chair controller 85 may determine that the chair 20 shifts positions when a difference between two movement outputs from the chair movement sensor 60 exceeds a predetermined threshold. In yet other embodiments, the chair controller 85 may analyze the rate of change of the movement outputs from the chair movement sensor 60 to determine the change in position or location of the chair 20. In some embodiments, the chair controller 85 may perform a combination of the analyses described above to determine whether the chair 20 shifts position and/or moves location.

The first capacitive sensor 65 and the second capacitive sensor 70 are also supported by the chair 20 and electrically coupled to (e.g., communicate with) the chair controller 85. The first capacitive sensor 65 and the second capacitive sensor 70 determine the degree of engagement of the back 40 of the chair 20 in supporting a user while sitting. In other words, the first capacitive sensor 65 and the second capacitive sensor 70 help determine a user's specific sitting position. Each of the first capacitive sensor 65 and the second capacitive sensor 70 generates a pressure output indicative of a pressure exerted by the user on the back 40 of the chair 20.

Figure 3:
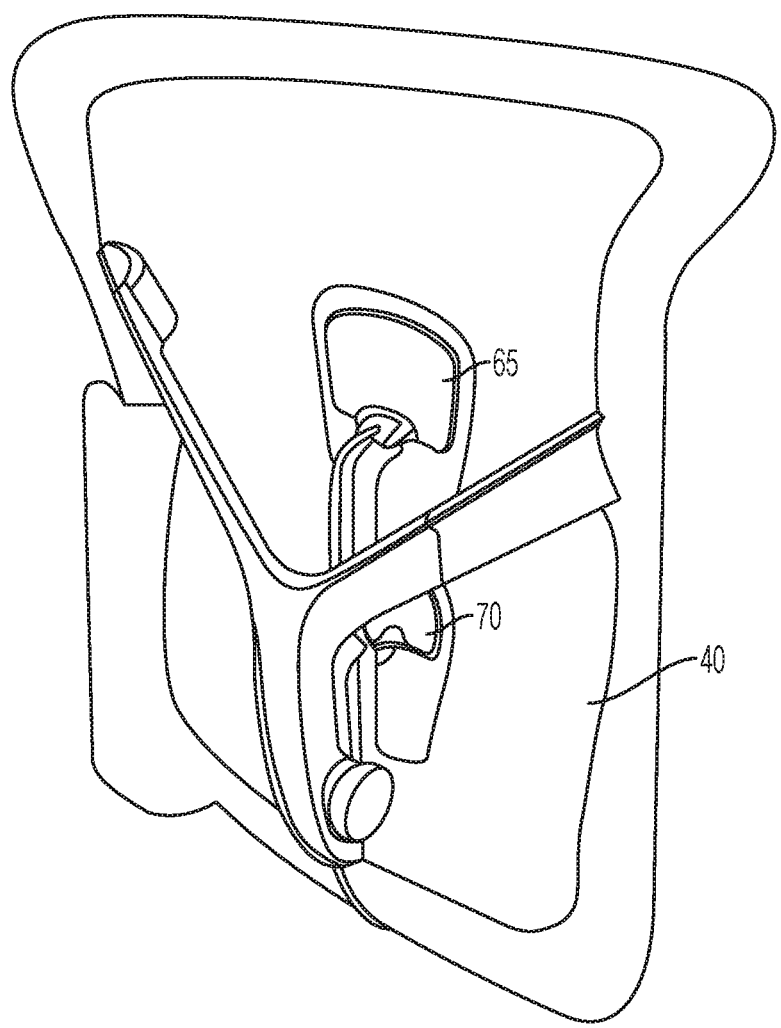
FIG. 3 is a back view of a portion of the chair of FIG. 2.

FIG. 3 is a back view of the back 40 of the chair 20. FIG. 3 illustrates the first capacitive sensor 65 and the second capacitive sensor 70 positioned on the back 40 (and, more particularly, on the lumbar support) of the chair 20. In some embodiments, the first capacitive sensor 65 and the second capacitive sensor 70 form a single capacitive pad that is physically coupled to the back 40 of the chair 20. The first capacitive sensor 65 and the second capacitive sensor 70 each send the pressure outputs to the chair controller 85. Based on the pressure outputs from the first capacitive sensor 65 and the second capacitive sensor 70, the chair controller 85 determines how much pressure the user exerts on the back 40 of the chair 20. In other words, the chair controller 85 can determine whether the user's back is resting on the back 40 of the chair 20 in a recline position, whether the user's back is resting on the back 40 of the chair 20 in a slouch position, or whether the user's back is separated from the back 40 of the chair 20 (e.g., the user is sitting in a perch position).

Figure 4B:
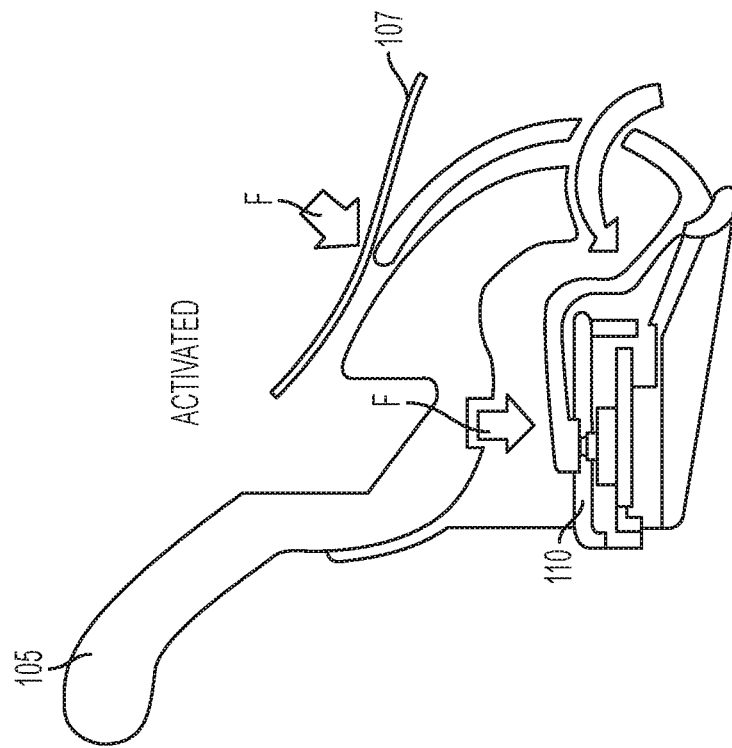
FIGS. 4A-4B illustrates a occupancy sensor positioned near a seat of the chair of FIG. 2.
Figure 4A:
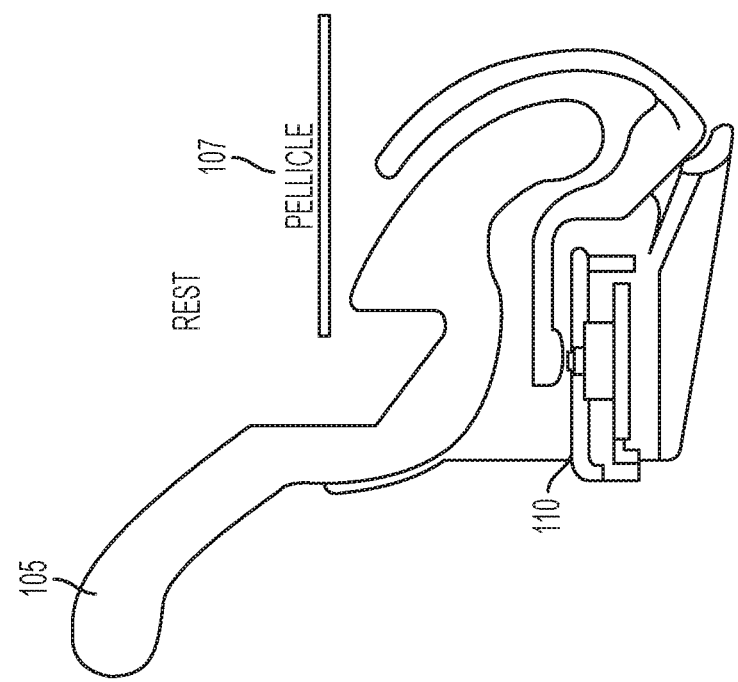

Referring back to FIGS. 1 and 2, the occupancy sensor 75 is supported by the chair 20 and electrically coupled to (e.g., communicates with) the chair controller 85. The occupancy sensor 75 detects a condition of the chair 20. In particular, the occupancy sensor 75 determines whether a user is currently occupying (e.g., sitting on) the chair 20. The illustrated occupancy sensor 75 is positioned underneath and on a seat pan 105 of the seat 45 of the chair 20, as shown in FIG. 2. In the illustrated embodiment, the seat pan 105 provides a support structure for a pellicle 107 that supports a user when the user sits on the chair 20. In other embodiments, the seat pan 105 may support other materials (e.g., a foam seat) that support the user when sitting on the chair 20. The occupancy sensor 75 includes a switch assembly 110 that is switchable between a first position (FIG. 4A) indicative of the chair 20 being vacant and a second position (FIG. 4B) indicative of the chair 20 being occupied. As shown in FIG. 4A, when the chair 20 is vacant, the seat pan 105 is separated from the switch assembly 110. However, as shown in FIG. 4B, when the chair 20 is occupied, the weight of the user generates a downward and outward force F, which causes the seat pan 105 to move downward and activate the switch assembly 110. The switch assembly 110 is electrically coupled to the chair controller 85 to indicate whether the switch assembly 110 is in the first position or the second position (i.e., whether the chair 20 is vacant or occupied).

Referring back to FIGS. 1 and 2, the height sensor 80 is also supported by the chair 20 and electrically coupled to (e.g., communicates with) the chair controller 85. The height sensor 80 determines a height of the seat 45 of the chair 20. In other words, the height sensor 80 determines a distance between the seat 45 and the bottom 115 of the support structure 50 (FIG. 2). In the illustrated embodiment, the height sensor 80 is a time-of-flight sensor. The height sensor 80 is configured to generate and transmit a signal (e.g., a light wave, an ultrasound wave, and the like). The height sensor 80 waits for the signal to be reflected back toward the height sensor 80 and calculates a distance based on the time between the transmitted signal and the received reflected signal. The height sensor 80 then sends the calculated distance to the chair controller 85. In some embodiments, the height sensor 80 sends the time between the transmitted signal and the received reflected signal to the chair controller 85. The chair controller 85 then calculates the distance between the seat 45 and the bottom 115 of the support structure 50 based on the time received from the height sensor 80.

As shown in FIG. 1, the chair controller 85 receives outputs from the rotation sensor 55, the chair movement sensor 60, the first capacitive sensor 65, the second capacitive sensor 70, the occupancy sensor 75, the height sensor 80, and the chair communication circuit 90. As described above, each of the chair sensors 55, 60, 65, 70, 75, 80 transmits their respective outputs to the chair controller 85. The chair controller 85 receives the angular output, the movement output, the pressure outputs, the occupancy output, and the height output and determines, based on the sensor outputs, a specific posture of the user. In particular, the chair controller 85 determines whether the user is in an upright position, a reclined position, a perch position, or a slouch position. In the upright position, the user's back is resting on the back 40 of the chair 20 while the reclining angle (e.g., as measured by the chair accelerometer) of the back 40 of the chair 20 remains below a predetermined reclining threshold (e.g., 2 degrees). In a reclined position, the user's back is also resting on the back 40 of the chair 20, but the reclining angle of the back 40 of the chair exceeds the predetermined reclining threshold or a similar predetermined threshold (e.g., 3 degrees). In a perch position, the user's back is separated from the back of the chair 20 and the user occupies a front portion of the seat 45 of the chair 20. In a slouch position, the user's back is resting on the back 40 of the chair 20, but in contrast to the reclined or the upright positions, the user exerts more pressure on his/her higher back than on his/her lower back. Therefore, in the slouch position, a difference between a measurement from the first capacitive sensor 65 and a measurement from the second capacitive sensor 70 is greater than in the previous positions (e.g., upright, reclined, perch). Thereby, the first capacitive sensor 65 and the second capacitive sensor 70 help the chair controller 85 differentiate between different seating positions of the user.

The chair controller 85 also commands the chair communication circuit 90 to transmit the chair sensor outputs to the wireless network 35. The chair communication circuit 90 receives the sensor outputs from the chair sensors 55, 60, 65, 70, 75, 80 and generates a wireless communication message to be transmitted through the wireless network 35. In the illustrated embodiment, the chair communication circuit 90 includes a Bluetooth® communication circuit having, for example, a processor, a transceiver, and an antenna. In other embodiments, the chair communication circuit 90 can communicate wirelessly using a different communication protocol (e.g., via Wi-Fi®, near field communications, Zig-bee® communications, Z-wave® communications, and the like). As shown in FIG. 1, the chair communication circuit 90 can transmit and receive wireless messages from the desk 25 and the mobile communication device 30 through the network 35. In the illustrated embodiment, the network 35 is a Bluetooth® network. In some embodiments, the chair communication circuit 90 transmits wireless messages including the sensor outputs from the chair sensors 55, 60, 65, 70, 75, 80. The chair communication circuit 90 may additionally or alternatively transmit wireless messages including information determined by the chair controller 85. For example, the chair communication circuit 90 may transmit a message including a determined position for the user, whether the chair 20 has rotated, whether the chair has received an impact, or a combination of the above.

Each of the chair sensors 55, 60, 65, 70, 75, 80, the chair controller 85, and the chair communication circuit 90 are electrically connected to a chair power supply. The chair power supply provides electrical power to the components of the chair 20. In some embodiments, the chair 20 may include additional components to condition the power from the chair power supply (e.g., to conform power from the power supply to specifications of each of the components of the chair 20). In the illustrated embodiment, the chair power supply includes a non-rechargeable lithium battery supported by the chair 20. In other embodiments, a different battery, such as a rechargeable battery, or different power source may be used.

Figure 5:
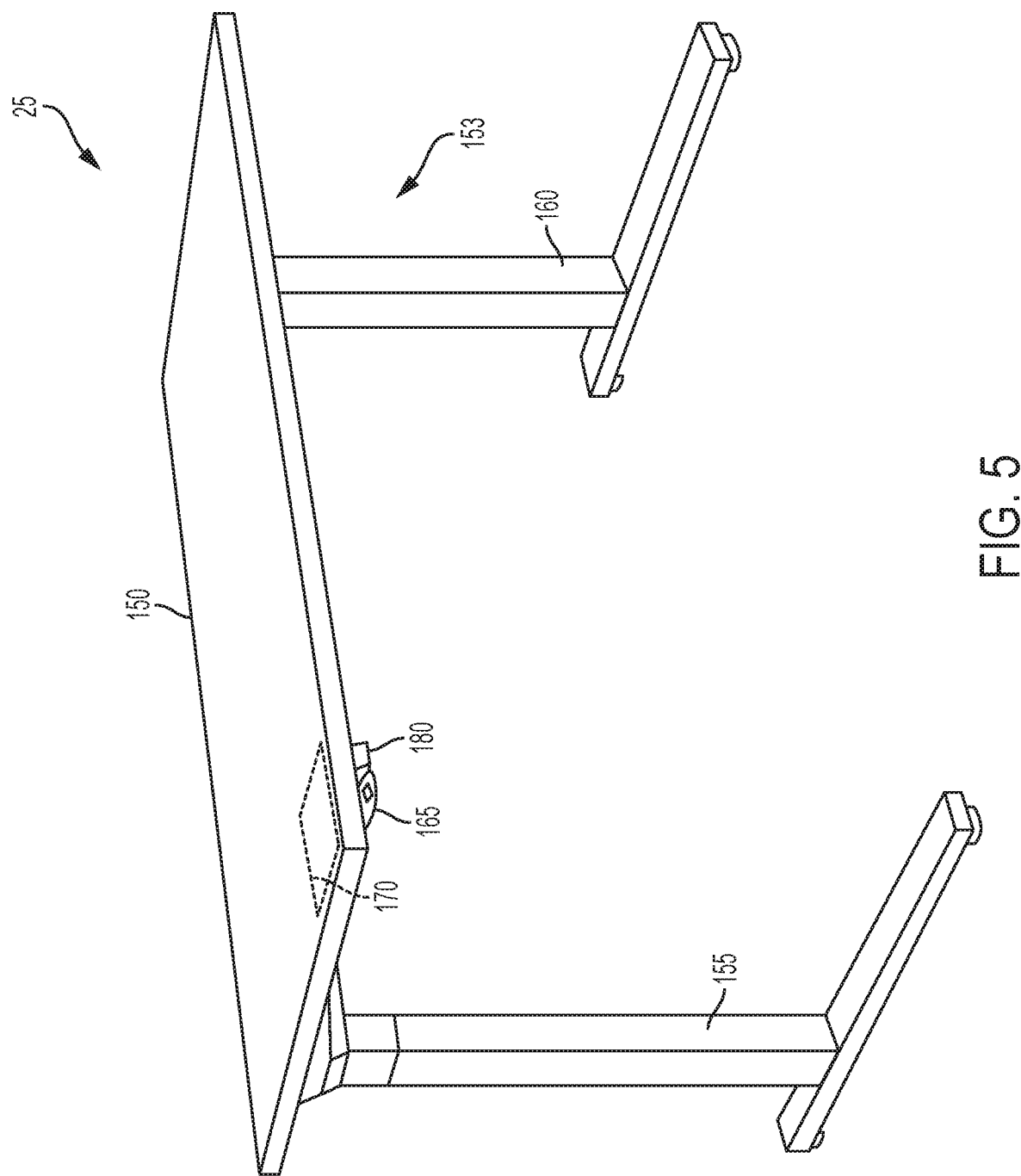
FIG. 5 is a perspective view of a desk in a first position.

As shown in FIG. 5, the desk 25 includes a work surface 150 and a support framework 153. The support framework 153 includes a first leg 155 and a second leg 160 for supporting the work surface 150 above the ground. In other embodiments, the support framework 153 may include fewer or more legs, and/or may support the work surface 150 at the sides or at the back of the work surface 150. The illustrated desk 25 also includes a manual actuator 165 coupled to the work surface 150, and a communication zone 170 defined on the work surface 150. As shown in FIG. 1, the desk 25 further includes a desk accelerometer 175, a user-presence sensor 180, a motor 185, a desk controller 190, and a desk communication circuit 195. The term "desk sensors" is used to refer to sensors 175 and 180 individually, collectively, and in combination with other sensors not explicitly noted here.

Figure 6:
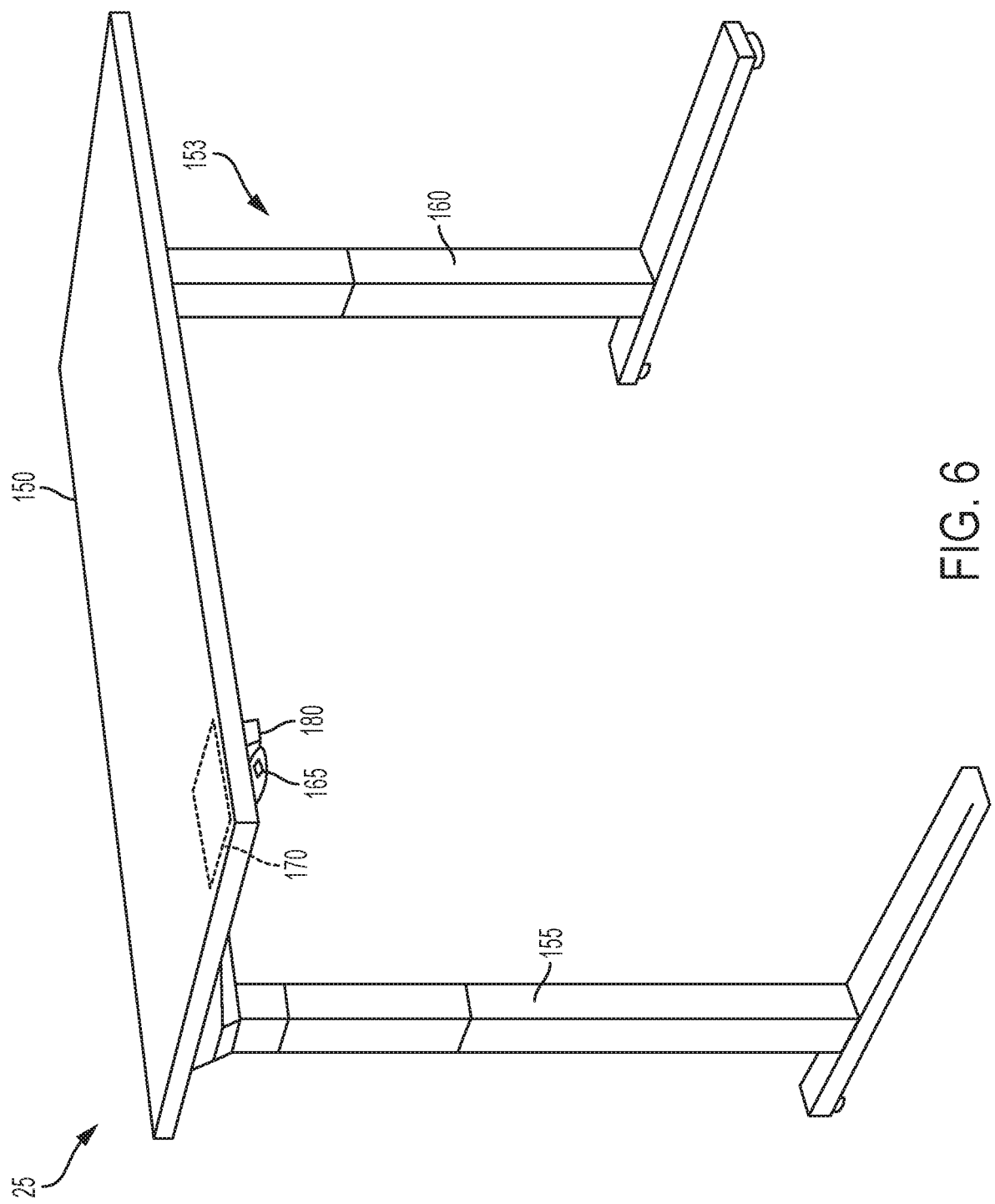
FIG. 6 is a perspective view of the desk in a second position.

The motor 185 is physically coupled (e.g., via gears, belts, and pulleys, or other suitable mechanisms) to the first leg 155 and the second leg 160. In some embodiments, a single motor may be coupled to both legs 155, 160. In other embodiments, the desk 25 may include two motors 185, such that one motor is coupled to each leg 155, 160. When energized, the motor 185 changes the position (i.e., height) of the support framework 153 by adjusting the heights of the first leg 155 and the second leg 160. In the illustrated embodiment, the first leg 155 and the second leg 160 are telescoping legs such that they can change positions between a raised position (e.g., to be used while standing) and a lowered position (e.g., to be used while sitting). FIG. 5 illustrates the desk 25 in the lowered position (or sitting position) in which the height of the first leg 155 and the height of the second leg 160 are reduced. FIG. 6, on the other hand, illustrates the desk 25 in the raised position in which the height of the first leg 155 and the height of the second leg 160 are increased. The motor 185 can also move the desk 25 to any intermediate height between the maximum height and the minimum height to adjust to specific user body types and seating and standing patterns. The motor 185 electrically communicates with the desk controller 190 to receive a command to lower and/or raise the top surface 150.

Figure 7:
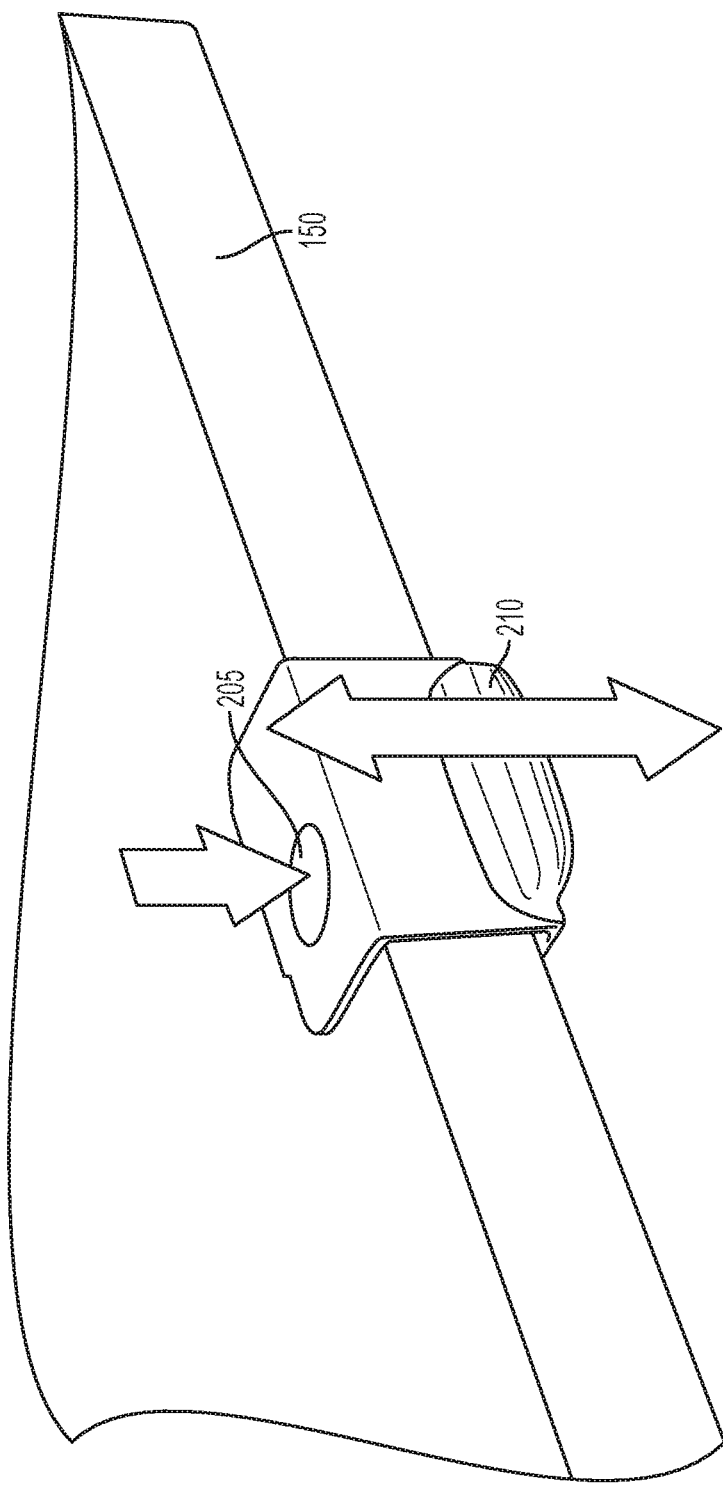
FIG. 7 is an enlarged view of a paddle switch of the desk of FIG. 5.

The actuator 165 is electrically coupled to the desk controller 190 to allow a user to manually control the motor 185. As shown in FIG. 7, the actuator 165 is a paddle switch including a preset button 205 and a movable switch 210. When the preset button 205 is activated (e.g., by receiving an input from a user), the desk 25 switches between the raised height (e.g., at a predetermined height) to the lowered height (e.g., at a different predetermined height). In contrast, the movable switch 210 is actuatable in a first downward direction and in a second upward direction. When the movable switch 210 is actuated by a user, the work surface 150 follows the movement of the movable switch 210. In other words, when the movable switch 210 is moved upward, the desk 25 increases its height until the user stops activating the movable switch 210, or until the user activates the movable switch 210 in the downward direction. Similarly, when the movable switch 210 is moved downward, the desk 25 decreases its height until the user stops activating the movable switch 210, or until the user activates the movable switch 210 in the upward direction. The preset button 205 and the movable switch 210 generate and transmit output signals to the desk controller 190. The desk controller 190 in turn converts the outputs received from the preset button 205 and the movable switch 210 into control signals for the motor 185.

In other embodiments, other suitable actuators may be employed. For example, the illustrated paddle switch 165 may only include the movable switch 210 and not the preset button 205. In such an embodiment, tapping (i.e., briefly moving) the switch 210 in one direction may move the desk 25 between the preset raised height and the preset lowered height, while holding the switch 210 in either direction may raise or lower the desk to non-preset positions as long as the switch 210 is held. Alternatively, the actuator may include a switch, dial, touchscreen, or other suitable user interface for moving the desk 25 between positions.

Additionally, the desk 25 may include an indicator light 215 (FIG. 1) associated with the actuator 165. For example, the indicator light 215 may be positioned within the actuator 165 to illuminate the actuator 165. The indicator light 215 indicates a state of the desk 25. In the some embodiments, the indicator light 215 lights up in a first color and/or at a first frequency to indicate that the desk 25 is available (e.g., unoccupied by a user). The indicator light 215 also lights up in a second color and/or at a second frequency to encourage the user to change positions (e.g., from a sitting position to a standing position or vice versa).

As shown in FIGS. 5 and 6, the desk 25 includes the communication zone 170 on top of the work surface 150 and near the actuator 165. The communication zone 170 is a predefined area of the desk 25 on which communications with the desk communication circuit 195 and the mobile communication device 30 are maximized and/or optimized. Due to its proximity to the desk communication circuit 195, the communication zone 170 enhances communication between the desk 25 and the mobile communication device 30. Therefore, when a user places his/her mobile communication device 30 on the communication zone 170, the mobile communication device 30 pairs with the desk 25 and enables wireless communications to be exchanged between the mobile communication device 30 and the desk 25.

Referring back to FIG. 1, the desk accelerometer 175 is electrically coupled to the desk controller 190 and detects impacts to the desk 25. In the illustrated embodiment, the desk accelerometer 175 is positioned near the actuator 165. In other embodiments, the desk accelerometer 175 may be positioned elsewhere on the desk 25. The desk accelerometer 175 generates an impact output when an impact on the desk 25 (e.g., a bump to the desk) is detected and sends the impact output to the desk controller 190.

In some embodiments, a vibration sensor may be used to replace the desk accelerometer 175. The vibration sensor may be electrically coupled to the desk controller 190 and detects vibrations on the desk 25, for example, tapping of a person's hand on the desk, bumping of the chair 20 against the desk 25, and the like. The vibration sensor may be positioned near the actuator 165, but the vibration sensor may be positioned elsewhere on the desk 25. The sensitivity of the accelerometer 175 or vibration sensor is calibrated to the portion of the desk 25 on which it is mounted, as different parts of the desk 25 will oscillate or vibrate at different amplitudes and frequencies in response to the same impact. The vibration sensor may also be configured to generate the impact output when a vibration is detected on the desk 25 (e.g., a bump to the desk). The impact output from the vibration sensor, like the impact output from the desk accelerometer 175 may be sent to the desk controller 190.

The user-presence sensor 180 is also electrically coupled to the desk controller 190. In the illustrated embodiment, the user-presence sensor 180 is an infrared (IR) sensor. The IR sensor 180 detects changes in the infrared frequencies such as, for example, from 300 GHz to 1 THz. The IR sensor 180 can detect when a person is nearby due to his/her body heat. Therefore, when a user is nearby (e.g., standing in front of the desk 25), the IR sensor 180 generates a positive thermal output. In contrast, when the user is remote from the desk 25 (e.g., left the location of the desk), the IR sensor 180 generates a decreasing thermal output indicative of the ambient temperature or an unchanging thermal output. In the illustrated embodiment, the IR sensor 180 is positioned near the paddle switch 165 and pointed toward the middle of the desk 25, as shown in FIG. 5. In this position, the IR sensor 180 is pointed toward an expected location for the user, and can, therefore, more easily and more accurately determine whether a user is standing nearby. The IR sensor 180 sends the thermal output to the desk controller 190 to indicate whether the user is near the desk 25 or remote from the desk 25.

The desk communication circuit 195 receives the sensor outputs from the desk sensors 175, 180 and from the paddle switch 165. The desk communication circuit 195 is also configured to receive the communications (e.g., messages) from the chair communication circuit 90. The communications from the chair communication circuit 90 may include indications of outputs from the chair sensors 55, 60, 65, 70, 75, 80 (e.g., sensor data), and/or may include indications of determinations already made by the chair controller 85 (e.g., determined position of the user, whether the chair 20 has rotated, whether an impact was received at the chair 20, and the like). In the illustrated embodiment, the desk communication circuit 195 includes a Bluetooth® communication circuit having, for example, a processor, a transceiver, and an antenna. In other embodiments, the desk communication circuit 195 communicates using different communication protocols (e.g., via Wi-Fi®, Zig-bee®, Z-wave®, near field communications, and the like). As shown in FIG. 1, the desk communication circuit 195 can transmit and receive wireless messages from the chair 20 and the mobile communication device through the network 35. As discussed above, in the illustrated embodiment, the network 35 is a Bluetooth® piconet. In the illustrated embodiment, the desk communication circuit 195 is configured to receive wireless messages from the chair communication circuit 90 including outputs from the chair sensors 55, 60, 65, 70, 75 80, and/or determinations made by the chair controller 85.

Each of the desk sensors 175, 180, the motor 185, the desk controller 190, and the desk communication circuit 195 is connected to a desk power supply. The desk power supply provides electrical power to the components of the desk 25. In the illustrated embodiments, the desk power supply includes a connection to an AC power source (e.g., a wall outlet). The desk power supply may include additional electrical components (e.g., voltage converters, filters, rectifiers, and the like) to condition the power from the AC power source to conform to the power specification of each of the components of the desk 25. In other embodiments, the desk power supply may include or connect to a different type of power source.

In the illustrated embodiment, the desk controller 190 is implemented by a processor or microcontroller. In some embodiments, the chair controller 85 and the desk controller 190 are implemented as separate microprocessor, each including a separate memory (not shown). In other embodiments, the chair controller 85 and the desk controller 190 may be each implemented as a microcontroller (with memory on the same chip). In other embodiments, the chair controller 85 and the desk controller 190 may each be implemented using multiple processors. In addition, the chair controller 85 and the desk controller 190 may each be implemented partially or entirely as, for example, a field-programmable gate array (FPGA), an application specific integrated circuit (ASIC), and the like and the corresponding memory may not be needed or be modified accordingly. In this example, the memory of the chair controller 85 and the desk controller 190 each includes non-transitory, computer-readable memory that stores instructions that are received and executed by the chair controller 85 and the desk controller 190, respectively, to carry out functionality of the pairing device 110 described herein. The memory of each the chair controller 85 and the desk controller 190 may include, for example, a program storage area and a data storage area. The program storage area and the data storage area may include combinations of different types of memory, such as a read-only memory and random-access memory.

The desk controller 190 is electrically coupled to the paddle switch 165, the desk accelerometer 175, the IR sensor 180, the motor 185, the desk power supply, and the desk communication circuit 195. As described above, in some embodiments, a vibration sensor may replace the desk accelerometer 175. The desk controller 190 receives the impact output from the desk accelerometer 175 (or the vibration sensor) and the thermal output from the IR sensor 180. The desk controller 190 uses these outputs to, among other things, pair the chair 20 with the desk 25, and determine whether to raise or lower the desk 25.

Figure 8:
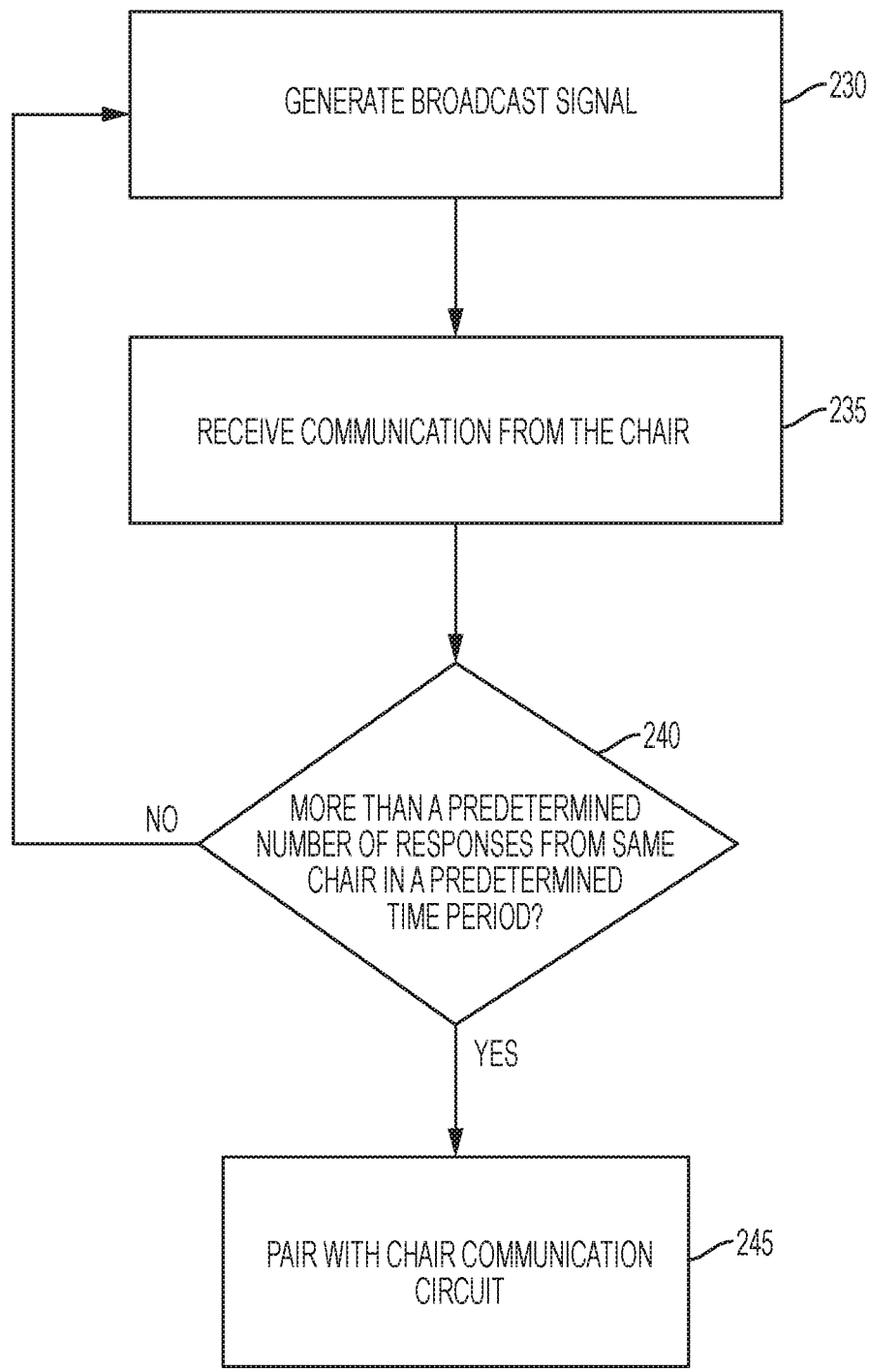
FIG. 8 is a flowchart illustrating a first method of paring the desk and chair of the intelligent furnishing system of FIG. 1.

FIG. 8 illustrates a method implemented by the desk controller 190 to pair the chair communication circuit 90 with the desk communication circuit 195. According to the method shown in FIG. 8, the desk 25 automatically pairs with a chair 20 after the desk 25 receives a predetermined number of responses from the same chair 20 (e.g., thereby indicating continued proximity). At step 230, the desk communication circuit 195 periodically generates a broadcast signal. At step 235, the desk communication circuit 195 then receives a response signal from the chair 20 and, more specifically, from the chair communication circuit 90. The desk controller 190 then determines whether more than a predetermined number of responses from the same chair 20 have been received within a predetermined period (step 240). For example, the desk controller 190 may determine whether more than 10 responses have been received from the same chair 20 over a period of approximately 2 hours. In other embodiments, the number of responses and/or the period may change. If the desk controller 190 determines that the desk communication circuit 195 has received more than the predetermined number of responses from the same chair 20 within the predetermined period, the desk communication circuit 195 pairs with the chair communication circuit 90 (step 245). In some embodiments, the desk 25 and/or the chair 20 may be equipped with a speaker, display, or other output device that indicates to the user that the desk 25 and the chair 20 have been successfully paired. On the other hand, if the desk controller 190 determines that insufficient responses from the same chair 20 have been received, the desk 25 continues to generate periodic broadcast signals to find a chair 20 with which to pair (step 230).

In some embodiments, the desk communication circuit 195 and the chair communication circuit 90 do not pair based on the number of responses to the broadcast signal. Rather, in some embodiments, the desk controller 190 simply determines whether the particular chair 20 has been within proximity for more than a predetermined period of time (e.g., three hours). In some embodiments, the desk controller 190 may determine that the chair 20 is proximate to the desk 25 when the chair 20 is positioned underneath the desk 25 for the predetermined period of time.

Figure 9:
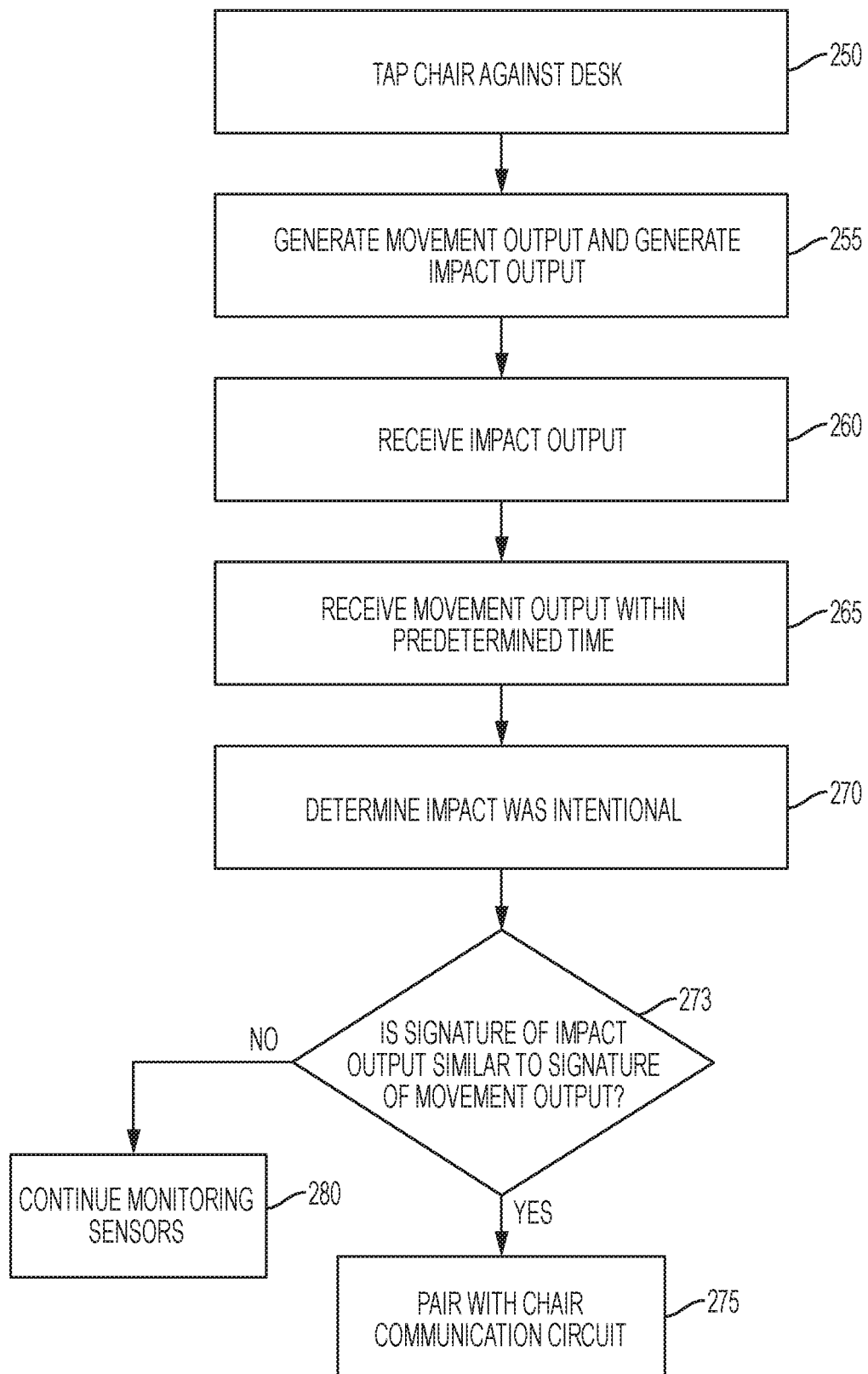
FIG. 9 is a flowchart illustrating a second method of pairing the desk and chair of the intelligent furnishing system of FIG. 1.

FIG. 9 illustrates another method implemented by the desk controller 190 that pairs the desk communication circuit 195 and the chair communication circuit 90 in response to a user action. If immediate (or faster) pairing between the chair 20 and the desk 25 is desired, the user may bump or tap the chair 20 against the desk 25 (step 250). At step 255, in response to the impact between the chair 20 and the desk 25, the chair movement sensor 60 and the desk accelerometer 175 (or the desk vibration sensor) each detects an impact and generates a movement output and an impact output, respectively. Since both the chair 20 and the desk 25 are impacted at the same time, the outputs are generated nearly simultaneously. Because the movement output and the impact output were generated in response to the same impact, the movement output and the impact output also have similar signatures. For example, the movement output and the impact output may have approximately equal amplitudes and durations, and may have opposing directions. The desk controller 190 then receives the impact output from the desk accelerometer 175 or from the vibration sensor (step 260). Nearly simultaneously, the desk communication circuit 195 receives a message (or the movement output) from the chair communication circuit 90 indicating that an impact was detected by the chair movement sensor 60 (step 265). Since the impact output from the desk accelerometer 175 (or the vibration sensor) and the message from the chair communication circuit 90 regarding a detected impact at the chair 20 happen within a predetermined time of each other, the desk controller 190 determines that the nearby chair 20 was impacted intentionally against the desk 25 to cause the chair 20 and the desk 25 to pair (step 270). In the illustrated embodiment, the desk controller 190 also compares the signatures associated with the movement output and the impact output (step 273).

If the signatures are similar, the desk controller 190 proceeds to step 275 for the chair communication circuit 90 and the desk communication circuit 195 to pair successfully. In the illustrated embodiment, the desk controller 190 determines that the signatures are similar when the signatures include specific and measurable similarities, such as, for example, an approximately equal amplitude and duration, opposing direction, and the like. In some embodiments, the desk controller 190 may require a double bump or tap (e.g., two or more successive impacts within a short period of time) to confirm that the impact was intentional. If, on the other hand, the desk controller 190 determines that the signatures are not similar, the desk communication circuit 195 does not pair with the suggested chair 20 because most likely the suggested chair 20 did not hit the desk 25 intentionally. In such an instance, the desk controller 190 continues to monitor for a signal from the chair movement sensor 60 and the desk accelerometer 175 or for other signals from the chair and desk sensors 55, 60, 65, 70, 75, 80, 175, 180 (step 280). Using the information from the chair movement sensor 60 and from the desk accelerometer 190, the desk controller 190 can compare the attitude of the movement output of the chair movement sensor 60 and determine a relational rotation of the chair 20 with respect to the desk 25.

In some embodiments, the desk controller 190 implements the method described with respect to FIG. 9 using information (e.g., outputs) from distance sensors positioned on both the chair 20 and the desk 25. The distance sensors may be used instead of or in addition to the chair movement sensor 60 and the desk accelerometer 175 (or vibration sensor). In such embodiments, the chair 20 and the desk 25 are each equipped with a distance sensor (e.g., an ultrasonic sensor, an infrared sensor, and the like). Each distance sensor transmits a signal (e.g., an ultrasonic signal or an infrared signal). When the signal generated by the distance sensor reaches another furniture item (e.g., the chair 20 or the desk 25), the signal bounces back to the distance sensor. Based on a parameter of the received return signal (e.g., a signal strength, time-of-flight, etc.), the distance sensor indicates a distance between the distance sensor and the other furniture item. In other words, a first distance sensor on the chair 20 indicates a first distance between the chair 20 and the desk 25, while a second distance sensor on the desk 25 indicates a second distance between the desk 25 and the chair 20. When using distance sensors rather than the movement sensors 60, 175, the desk controller 190 performs similar steps as those described with respect to FIG. 9. In particular, the desk controller 190 determines whether the changes in the distance outputs from the distance sensors indicate that the chair 20 "bumped" the desk 25. In this context, the term "bump" can mean actual physical contact or the distance sensor determining that the chair 20 is in close proximity to the desk 25. The desk controller 190 may monitor the distance outputs from the chair 20 and the desk 25 over time to determine whether the distance outputs from both the chair 20 and the desk 25 are changing at approximately the same time and at approximately the same rate. For example, if the movement of both distance sensors increase at the same time, the desk controller 190 determines that the chair 20 is moving away from the desk 25. Alternatively, if the measurements of both distance sensors decrease at the same time, the desk controller 190 determines that the chair 20 is moving toward the desk 25. This information can be used by the desk controller 190 to determine that the chair 20 and the desk 25 were intentionally "tapped" and therefore pair the furniture items 20, 25 together.

Once the chair communication circuit 90 and the desk communication circuit 195 are paired, the chair communication circuit 90 periodically sends messages to the desk communication circuit 195. As mentioned above, the messages may include sensor data and/or determinations made by the chair controller 85. The chair communication circuit 90 may send the messages at predetermined time intervals (e.g., once every 30 seconds) or may send messages when a change in sensor data and/or a new determination is made. The exchange of communications between the chair communication circuit 90 and the desk communication circuit 195 enable the desk controller 190 to raise and lower the work surface 150, with or without user input. For example, the desk 25 can prompt a user sitting in the paired chair 20 (e.g., by activating the indicator light 215) to actuate the actuator 165 and raise the desk 25 if the user has been sitting for an extended period of time. Alternatively, the desk 25 can automatically raise and lower the work surface 150 by monitoring both the chair sensors 55, 60, 65, 70, 75, 80, and the desk sensors 175, 180.

Figure 10:
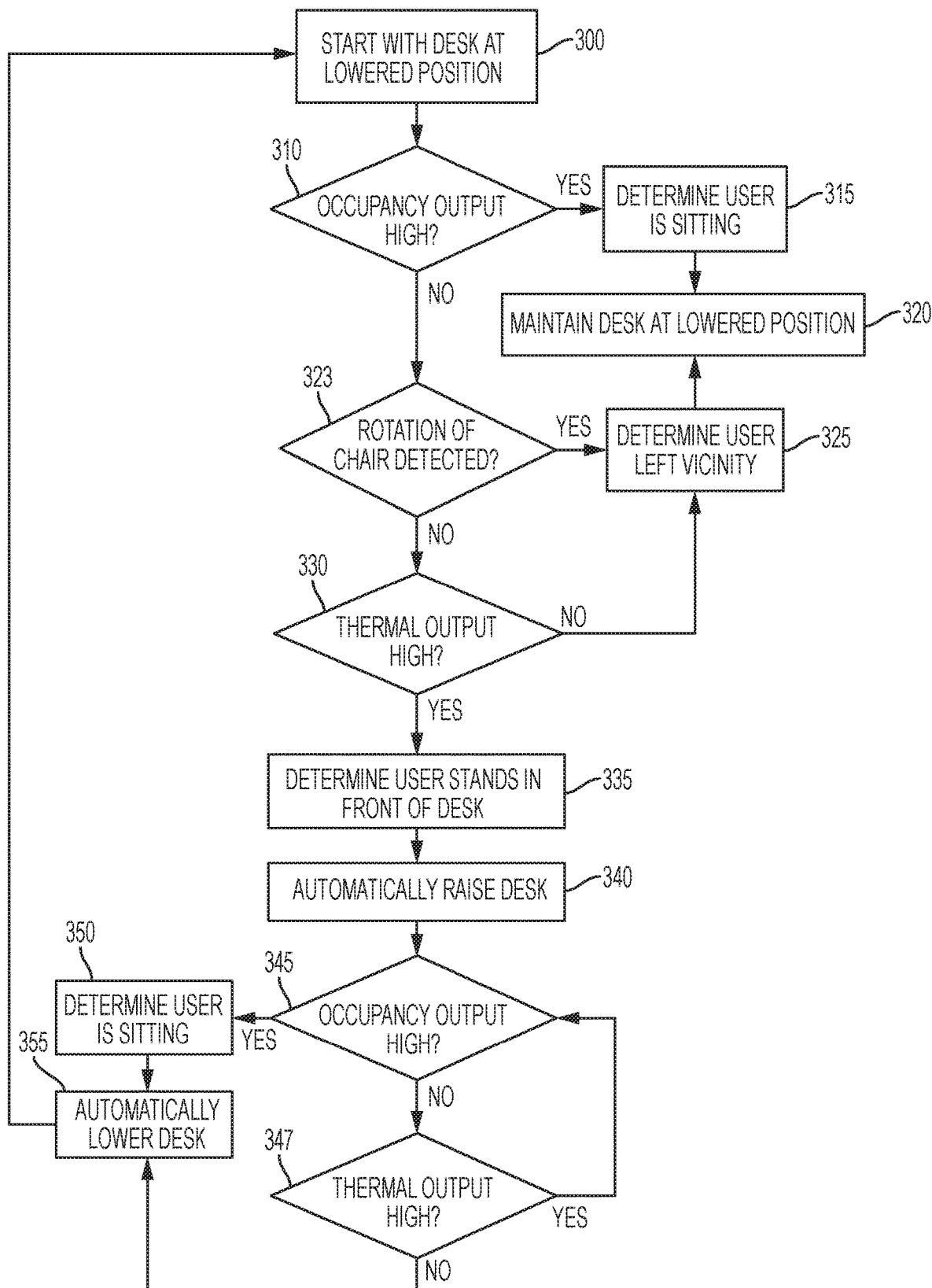
FIG. 10 is a flowchart illustrating a method of automatically moving the desk from the first position to the second position.

FIG. 10 illustrates a method of automatically raising and lowering the desk 25 based on the monitoring the chair sensors 55, 60, 65, 70, 75, 80, and the desk sensors 175, 180. By monitoring a combination of the occupancy sensor 75, the rotation sensor 55, and the IR sensor 180, the desk controller 190 can determine whether the user is currently occupying the chair 20, whether the user is currently standing in front of the desk 25 (e.g., waiting for the desk 25 to move to the raised position), and whether the user left the vicinity of the chair 20 and desk 25. For example, typically when a user leaves the vicinity of the chair 20 and desk 25, the chair 20 is rotated such that the seat 45 of the chair 20 faces toward the right or the left side of the desk 25. By contrast, when a user switches from a sitting position to a standing position (e.g., to utilize the desk 25 at its raised position), the chair 20 is not rotated, but is rather pushed 20 straight back as the user stands up. Therefore, by monitoring a combination of the occupancy sensor 75, the rotation sensor 55, and the IR sensor 180, the desk controller 190 can accurately and automatically determine whether the user is standing up from the chair 20 to leave the desk 25, or whether the user is standing up from the chair 20 stand and work at the desk 25. Based on this determination, the desk controller 190 raises the desk 25, lowers the desk 25, or maintains the desk 25 in its current position.

In the example illustrated by FIG. 10, the desk 25 starts at the lowered position (step 300). The desk controller 190 then proceeds to monitor the occupancy output from the occupancy sensor 75 of the chair 20 (step 305). If (at step 310) the occupancy output is high (thereby indicating that a user is occupying the chair 20), the desk controller 190 determines that the user remains seated (step 315) and keeps the desk 25 at the lowered position (step 320). If, on the other hand, the desk controller 190 determines (at step 310) that the occupancy output is low (thereby indicating that the chair 20 is unoccupied), the desk controller 190 proceeds to check the angular output from the rotation sensor 55 (step 323). At step 323, the desk controller 190 determines whether the angular output from the rotation sensor 55 indicates that the chair 20 has rotated. If the desk controller 190 determines that the angular output from the rotation sensor 55 indicates that the chair 20 has rotated (i.e., that the chair 20 is unoccupied and the chair 20 was recently rotated), the desk controller 190 determines that the user has left the vicinity of the chair 20 and desk 25 (step 325). In other words, the desk controller 190 determines the user is in an absent position when the rotation sensor 55 indicates that the chair 20 has rotated. Since the user has left the vicinity of the chair 20 and desk 25, the desk controller 190 maintains the desk 25 at the lowered position (step 320).

In contrast, if the desk controller 190 determines (at step 323) that the angular output from the rotation sensor 55 indicates that the chair 20 was not rotated prior to being vacated, the desk controller 190 proceeds to monitor the thermal output from the IR sensor 180 (step 330). In particular, at step 330, the desk controller 190 determines whether the thermal output from the IR sensor 180 is high, indicating that the user remains nearby (e.g., in front of the desk 25). If the desk controller 190 determines that the thermal output is low (thereby indicating an absence of the user), the desk controller 190 then determines that the user has left the vicinity of the chair 20 and desk 25 (step 325), and the desk controller 190 maintains the desk 25 at the lowered height (step 320). If, however, the desk controller 190 determines that the thermal output form the IR sensor 180 is high (thereby indicating the presence of the user), the desk controller 190 determines that the user is standing in front of the desk 25 (step 335), and automatically (i.e., without further user input) energizes the motor 185 to raise the desk 25 from the lowered position to the raised position (step 340). In some embodiments, the user changes from a sitting position to a standing position in response to the indicator light 215 on the paddle switch 165 changing colors to remind the user to change positions (e.g., from a sitting position to a standing position).

Once the desk 25 is at the raised position, the desk controller 190 continues to monitor whether the occupancy output from the occupancy sensor 75 is high (step 345). A change in the occupancy output from the occupancy sensor 75 to high indicates that the user changes from a standing position to a sitting position. Therefore, if the desk controller 190 determines that the occupancy output from the occupancy sensor 75 is high, the desk controller 190 determines that the user is sitting on the chair 20 (step 350), and automatically (i.e., without user input) energizes the motor 185 to lower the desk 25 from the raised position to the lowered position (step 355). If the desk controller 190 determines that the occupancy output from the occupancy sensor 75 remains low, the desk controller 190 monitors the thermal output from the IR sensor 180 (step 347). If the IR sensor 180 determines that the user is no longer present (step 347), the desk controller 190 automatically lowers the desk 25 (step 355) to the lowered position and returns to step 300 to monitor the occupancy sensor 75, the rotation sensor 55, and the IR sensor 180. In other embodiments, the desk controller 190 may leave the desk 25 in the raised position when the user is absent.

The user can override the desk controller 190 by manually lowering or raising the desk 25. For example, if the desk controller 190 determines that the user shifted from a sitting position to a standing position and commands the motor 185 to increase the height of the desk 25, the user may override the change in desk height using the manual actuator 165. The desk controller 190 may then receive a user input via the manual actuator 165 and change the control signal sent to the motor 185 in response to the user input. In one example, the desk controller 190 determines a desired position (or movement) of the desk 25 based on the user input. The desk controller 190 overrides the first control signal sent to the motor 185 when the desired position (or direction of movement) is different (e.g., opposite) than that indicated by the first control signal. The desk controller 190 may then send a second control signal to the motor 185 such that the height of the desk 25 (e.g., the support framework 153) reaches the desired height. After the automatic control of the desk 25 is overridden by the manual actuator 165, the desk controller logic automatically jumps to step 300 or step 340, based on the height of the desk 25. In these instances, however, the desk controller 190 may remain at step 300 or step 340 until the logic is retriggered by a user sitting on the chair 20 and thereby triggering the occupancy sensor 75. After the user sits on the chair 20 and the occupancy sensor 75 is triggered (e.g., outputs a high occupancy output), the desk controller 190 continues with the logic from step 305 and the desk 25 automatically lowers or raises according to the user's position.

In summary, the method shown in FIG. 10 illustrates that the desk 25 is configured to determine whether the user is sitting on the chair 20 (e.g., if the occupancy sensor 75 indicates the chair 20 is occupied), whether the user is currently standing in front of the desk 25 (e.g., if the occupancy sensor 75 indicates the chair 20 is vacant, the chair 20 was not rotated before being vacated, and the IR sensor 180 continues to indicate a user is nearby), or whether the user left the vicinity of the chair 20 and desk 25 (e.g., if the occupancy sensor 75 indicates that the chair 20 is vacant, the chair 20 was rotated before being vacated, and the IR sensor 180 indicates that the user is absent). When the desk controller 190 determines that the user is sitting on the chair 20, the desk controller 190 automatically energizes the motor 185 to lower the desk 25 to the lowered position. Additionally, when the desk controller 190 determines that the user is standing in front of the desk 25, the desk controller 190 automatically energizes the motor 185 to raise the desk 25 to the raised position. When the desk controller 190 determines that the user has vacated the vicinity of the chair 20 and desk 25, the desk controller 190 automatically restores the desk 25 to the lowered position. In some embodiments, when the desk controller 190 determines that the user has vacated the vicinity of the chair 20 and desk 25, the desk controller 190 maintains the desk 25 in its current position.

Although the methods described with respect to FIGS. 8-10 were described as being performed by the desk controller 190, in some embodiments, the chair controller 85 may perform some or all of the steps described with respect to FIGS. 8-10. Alternatively, an external controller (e.g., a processor of the mobile communication device 30) may perform the steps as described with respect to FIGS. 8-10.

Additionally, although the method described with respect to FIG. 10 includes monitoring the occupancy sensor 75, the rotation sensor 55, and the IR sensor 180, in some embodiments only a subset of those sensors 55, 75, 180 are monitored and analyzed to determine when the automatically move the desk 25 from the raised position to the lowered position and/or from the lowered position to the raised position.

As shown in FIG. 1, the mobile communication device 30 also communicates with the chair 20 and desk 25 wirelessly through the network 35. The mobile communication device 30 is, for example, a smartphone, a tablet computer, or a fob that is carried by a user. The illustrated mobile communication device 30 includes output devices 360, a processor 365, a memory 370, and a device communication circuit 375. The mobile communication device 30 communicates with the chair 20 and the desk 25 through the device communication circuit 375 and the wireless network 35. In the illustrated embodiment, the wireless network 35 includes a mesh network. In other embodiments, however, other types of networks can be used instead. As discussed above, the wireless network 35 is a Bluetooth® network. In other embodiments, the wireless network 35 may be another type of network such as, for example, a Wi-Fi® network, a Zig-bee network, a Z-wave® network, a near field communication network, and the like.

In order to enable communications between the mobile communication device 30, the chair 20, and the desk 25, the mobile communication device 30 is paired to the desk 25. To pair the mobile communication device 30 to the desk 25, the mobile communication device 30 is positioned on the communication zone 170. When the mobile communication device 30 is placed on the communication zone 170 of the desk 25, the desk communication circuit 195 and the device communication circuit 375 are within communication range of each other and are paired. The mobile communication device 30 may display, via the output devices 360, a confirmation that the mobile communication device 30 has paired with the desk 25. In some embodiments, the chair 20 may also include a communication zone to pair with the mobile communication device 30.

Figure 11:
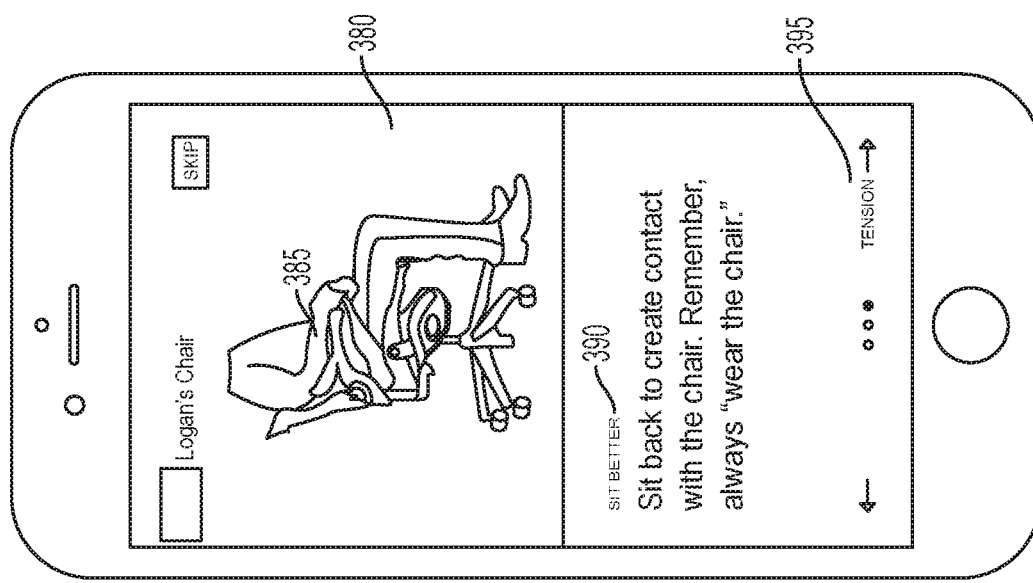

When the mobile communication device 30 is paired with the desk 25 or chair 20 for the first time, the mobile communication device 30 generates a graphical user interface that guides the user through a chair set up and/or through a desk set up. FIG. 11 shows an exemplary screenshot of a graphical user interface (GUI) 380 that displays an illustration 385 of a proper posture on the chair 20, as well as an instruction 390 on how to achieve the proper posture shown in the illustration 385. In the illustrated embodiment, the graphical user interface 380 guides the user through how to achieve a proper pose with respect to the back 40 of the chair 20. The graphical user interface 380 may additionally or alternatively guide the user through proper poses with respect to a height of the seat 45 and/or a tilt of the seat 45 with respect to a horizontal level (e.g., the floor). The graphical user interface 380 also displays at least one navigation actuator 395 to receive more information regarding proper postures. If the chair 25 is outfitted with actuators to adjust height, tilt resistance, arm height, or lumbar support, the mobile communication device 30 would be able to adjust those settings via the graphical user interface 380.

Figure 12:
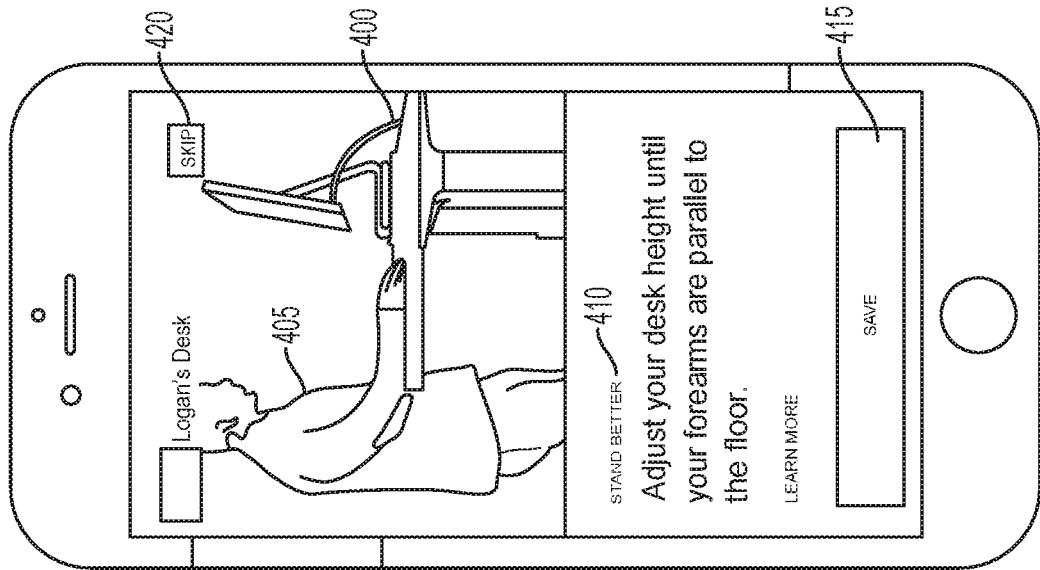
FIGS. 11-14 are exemplary screenshots of graphical user interfaces generated by a mobile communication device of the intelligent furnishing system of FIG. 1.

When the mobile communication device 30 pairs with the desk 25, the mobile communication device 30 can also generate a second graphical user interface 400, as shown in FIG. 12. The second graphical user interface 400 also displays a second illustration 405 of a proper posture on the desk 25, as well as an instruction 410 on how to achieve the illustrated posture. Additionally, when adjusting the desk 25, the graphical user interface 400 displays a save option 415 to save the current height of the desk 25 as a preset configuration to be associated with a particular user. The second graphical user interface 400 also displays at least one navigation actuator 420 to guide the user through proper postures on the desk 25. In some embodiments, while the mobile communication device 30 displays the second graphical user interface 400, the indicator light 215 flashes or stays lit in a specific color to indicate that individual set up is currently taking place.

Figure 13:
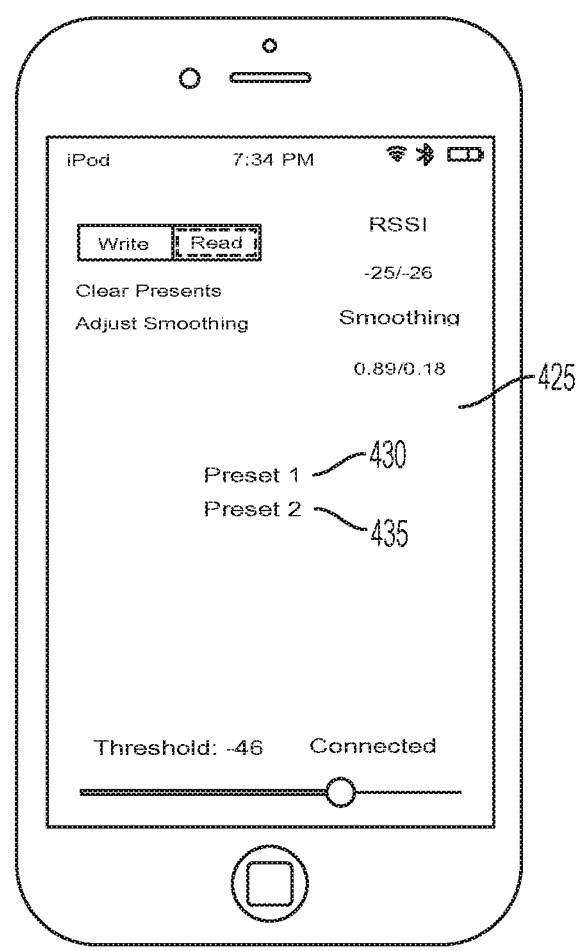

If the mobile communication device 30 has paired with the desk 25 and/or chair 20 before, the mobile communication device 30 displays a welcome screen 425 that displays available presets for the desk 25 and/or chair 20, as shown in FIG. 13. The desk controller 190 is configured to recognize the user based on the paired mobile communication device 30. In the exemplary welcome screen 425 of FIG. 13, the mobile communication device 30 illustrates a Preset One 430 and a Preset Two 435 for selection. Preset one 430 represents the specific height for the desk 25 in the raised height for the particular user of the mobile communication device 30. In other words, the Preset One 430 stores the height of the desk 25 that was stored when the user's forearms were parallel to the floor when the user was in a standing position. Analogously, the Preset Two 435 stores the height of the desk 25 that was stored when the user's forearms were parallel to the floor when the user was in a sitting position. A user may select Preset One or Preset Two by selecting one of the actuators on the welcome screen 425. Alternatively or additionally, a user may select Preset One or Preset Two by tapping on the preset button 205, which automatically moves the desk 25 to one of the raised position or the lowered position according to the heights stored on the Preset One and/or Preset Two. In some embodiments, the user may sign in directly to the desk 25 using, for example, a passcode, a biometric sensor, and the like. The desk 25 may then identify the user and move the desk 25 to match the user's stored preferred height (e.g., Preset One or Present Two).

The mobile communication device 30 allows a user to move between sit-stand desks and have his/her preset settings (e.g., desk heights) automatically associated with that desk. Similarly, by storing user's preferences on a mobile communication device, different users can use the same sit-stand desk without having to reprogram the desk for each user. Instead, the desk can automatically determine a particular user's preferences by pairing and communicating with his/her mobile communication device.

Figure 14:
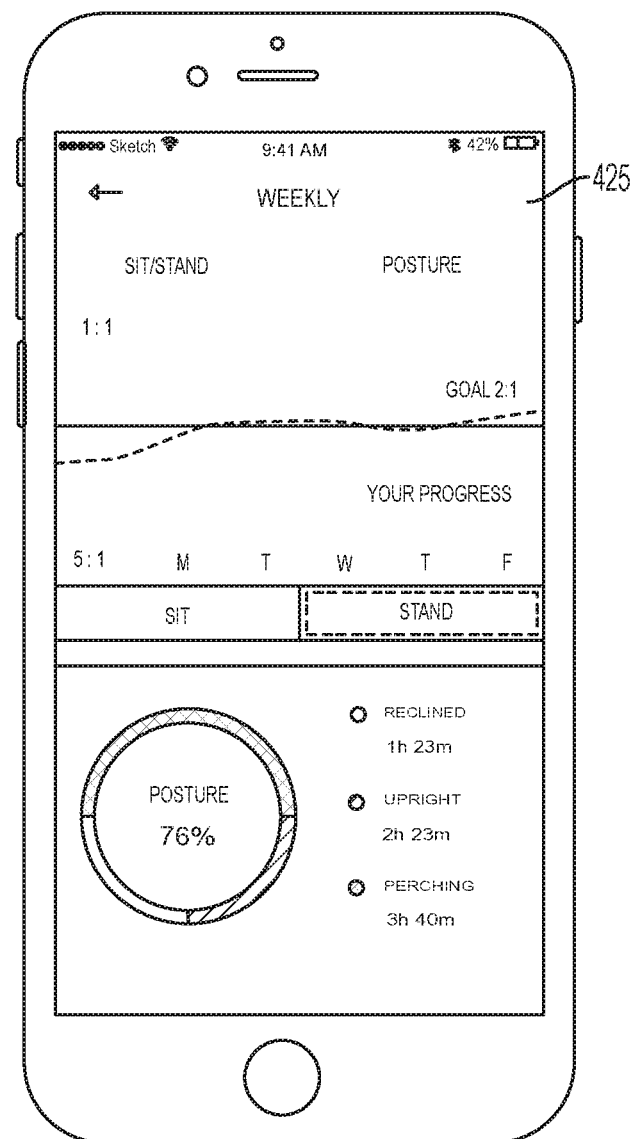

Once paired, the mobile communication device 30 receives information regarding the outputs from the chair sensors 55, 60, 65, 70, 75, 80, and from the desk sensors 175, 180. The mobile communication device 30 gathers and stores the information from the chair and desk sensors 55, 60, 65, 70, 75, 80, 175, 180 and can present information to the user based on the information gathered from the chair and desk sensors 55, 60, 65, 70, 75, 80, 175, 180, the chair controller 85, and the desk controller 190. For example, as shown in FIG. 14, the mobile communication device 30 generates a third graphical user interface 450 that displays daily, weekly, or monthly data such as, for example, sit time to stand time ratios and amount of time spent in particular sitting postures (e.g., reclined upright, and perching). Additionally, the third graphical user interface 450 may also provide more or less information about progress toward a particular goal (e.g., a particular target sit time to stand time ratio), or the like. In some embodiments, the mobile communication device 30 may generate an alert, or communicate with the chair 20 or desk 25 to generate an alert, to recommend to the user to switch from a sitting position to a standing position, or from a standing position to a sitting position. Providing the third graphical user interface 450 for the user allows the user to maintain control over how he/she interacts with the chair 20 and desk 25, while at the same time improving posture and sit time to stand time ratios with a plan for long term goals.

In some embodiments, the mobile communication device 30 may transmit the user data to a remote server for storage and easy retrieval. For example, the user data could be shared with a company's human resources department as part of a wellness plan.

Additionally, although the smart furnishing system 100 was described with respect to only one chair 20 and one desk 25, it should be understood that a plurality of chairs, a plurality of desks, and a plurality of mobile communication devices could be in communication with each other through the wireless network 35. Therefore, a chair 20 could be moved from one desk to another without losing any of the advantages of using an intelligent chair 20 as the one described herein.

Thus, the invention provides, among other things, an intelligent furnishing system configured to automatically change position of at least one furnishing item based on sensors of a different furnishing item. Various features and advantages of the invention are set forth in the following claims.

What is claimed is:

1. A method of communicatively pairing a first furnishing item with a second furnishing item, the method comprising:
impacting the first furnishing item against the second furnishing item;
generating a first output with a first sensor of the first furnishing item in response to an impact between the first furnishing item and the second furnishing item;
generating a second output with a second sensor of the second furnishing item in response to the impact between the first furnishing item and the second furnishing item;
receiving, by a controller, the first output;
receiving, by the controller, the second output; and
pairing a first communication circuit of the first furnishing item with a second communication circuit of the second furnishing item in response to receiving the second output within a predetermined time of receiving the first output.

2. The method of claim 1, further comprising:
determining, based on a comparison of the first output and the second output, whether the first output and the second output are indicative of a same impact; and
wherein pairing the first communication circuit with the second communication circuit includes pairing the first communication circuit with the second communication circuit in response to determining that the first output and the second output are indicative of the same impact.

3. The method of claim 2, wherein comparing the first output with the second output includes comparing a first signature of the first output with a second signature of the second output, the first signature and the second signature each including one selected from a group consisting of an amplitude, a duration, and a direction of the first output and the second output, respectively.

4. The method of claim 2, wherein determining whether the first output and the second output are indicative of the same impact includes determining that the first output and the second output are indicative of the same output when an amplitude of the first output and the second output are approximately equal.

5. The method of claim 4, wherein determining that the first output and the second output are indicative of the same impact includes determining that a first direction of the first output is opposite a second direction of the second output.

6. The method of claim 1, further comprising, after pairing the first communication circuit with the second communication circuit, periodically sending, from the first communication circuit, sensor data from a third sensor of the first furnishing item.

7. The method of claim 6, further comprising moving the second furnishing item using a motor in response to the sensor data received from the first furnishing item.

8. The method of claim 1, wherein generating the first output with the first sensor includes generating the first output with a first accelerometer of the first furnishing item, and wherein generating the second output includes generating the second output with a second accelerometer of the second furnishing item.

9. The method of claim 1, wherein generating the first output includes generating the first output indicative of a first distance between the first furnishing item and the second furnishing item, and wherein generating the second output includes generating the second output indicative of a second distance between the first furnishing item and the second furnishing item.

10. The method of claim 1, wherein impacting the first furnishing item with the second furnishing item includes impacting a chair with a desk.

11. A furniture system comprising:
a first furnishing item including
a first sensor configured to generate a first output in response to an impact between the first furnishing item and a second furnishing item, and
a first communication circuit configured to send wireless messages to the second furnishing item when paired with a second communication circuit of the second furnishing item;
the second furnishing item including
a second sensor configured to generate a second output in response to the impact between the first furnishing item and the second furnishing item, and
a second communication circuit configured to receive wireless messages from the first furniture item when paired with the first communication circuit; and
a controller coupled to the first furnishing item and the second furnishing item, the controller configured to:
receive the first output from the first sensor,
receive the second output from the second sensor,
pair the first communication circuit with the second communication circuit in response to receiving the second output within a predetermined time from receiving the first output.

12. The furniture system of claim 11, wherein the controller is configured to determine, based on a comparison of the first output and the second output, whether the first output and the second output are indicative of a same impact, and to pair the first communication circuit with the second communication circuit when the first output and the second output are indicative of the same impact.

13. The furniture system of claim 12, wherein the controller is configured to compare a first signature of the first output with a second signature of the second output, the first signature and the second signature each including one selected from a group consisting of an amplitude, a duration, and a direction of the first output and second output, respectively.

14. The furniture system of claim 13, wherein the controller is configured to determine that the first output and the second output are indicative of the same impact when a first amplitude of the first output and a second amplitude of the second output are approximately equal.

15. The furniture system of claim 14, wherein the controller is configured to determine that the first output and the second output are indicative of the same impact when a first direction of the first output is opposite a second direction of the second output.

16. The furniture system of claim 11, wherein the first furnishing item includes a third sensor configured to detect a condition of the first furnishing item, and wherein the first communication circuit is configured to periodically send sensor data from the third sensor to the second communication circuit when the first communication circuit and the second communication circuit are paired.

17. The furniture system of claim 11, wherein the first sensor includes a first accelerometer, and the second sensor includes a second accelerometer.

18. The furniture system of claim 11, wherein the first sensor includes a first distance sensor, and the second sensor includes a second distance sensor.

19. The furniture system of claim 11, wherein the first furniture item includes a chair and the second furniture item includes a desk.

* * * * *